(12) United States Patent
Chan (10) Patent No.: US 10,993,299 B1
(45) Date of Patent: Apr. 27, 2021

(54) LIGHTING DEVICE DRIVING CIRCUIT

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/865,407

(22) Filed: May 3, 2020

(30) Foreign Application Priority Data

Dec. 30, 2019 (TW) .................................. 108148365

(51) Int. Cl.
| | |
|---|---|
| *H05B 45/34* | (2020.01) |
| *H05B 45/39* | (2020.01) |
| *H05B 45/325* | (2020.01) |
| *H05B 45/36* | (2020.01) |

(52) U.S. Cl.
CPC ........... *H05B 45/34* (2020.01); *H05B 45/325* (2020.01); *H05B 45/36* (2020.01); *H05B 45/39* (2020.01)

(58) Field of Classification Search
CPC ...... H05B 45/34; H05B 45/36; H05B 45/325; H05B 45/39; H05B 45/10; H05B 45/37; H02J 1/02; H02M 1/08; H02M 1/14; H02M 1/143; H02M 1/15; H02M 1/42; H02M 1/4258; H02M 2001/0009; H02M 3/33507; Y02B 70/10; Y02B 70/126
See application file for complete search history.

(56) References Cited

U.S. PATENT DOCUMENTS

| | | | | |
|---|---|---|---|---|
| 4,525,739 A | * | 6/1985 | Fitzgerald | ......... H02M 3/33507 |
| | | | | 315/411 |
| 2014/0063857 A1 | * | 3/2014 | Peng | ................. H02M 3/33507 |
| | | | | 363/16 |
| 2014/0252973 A1 | * | 9/2014 | Liu | .......................... H02M 1/42 |
| | | | | 315/200 R |
| 2017/0288557 A1 | * | 10/2017 | Fang | ................... H02M 1/4258 |

* cited by examiner

*Primary Examiner* — Renan Luque
(74) *Attorney, Agent, or Firm* — Winston Hsu (57) ABSTRACT

An LED driving circuit includes a transformer circuit, a voltage supply circuit, a voltage-stabilizing circuit and a ripple compensation circuit. The transformer circuit is configured to convert an input voltage into a ripple output voltage. The voltage supply circuit is configured to provide a driving voltage associated with the maximum value of the ripple output voltage. The voltage-stabilizing circuit is configured to provide a first pulse DC voltage associated with the variation of the ripple output voltage. The ripple compensation circuit is configured to provide a second pulse DC voltage associated with the value of the input voltage, provide a compensation voltage according to the first pulse DC voltage, the second pulse DC voltage and the driving voltage, and provide a pure DC output voltage by superposing the compensation voltage on the ripple output voltage.

19 Claims, 4 Drawing Sheets

LIGHTING DEVICE DRIVING CIRCUIT

CROSS REFERENCE TO RELATED APPLICATION

This application claims priority of Taiwan Application No. 108148365 filed on 2019 Dec. 30.

BACKGROUND OF THE INVENTION

1. Field of the Invention

The present invention is related to a lighting device driving circuit, and more particularly, to an LED driving circuit capable of improving flicker phenomenon.

2. Description of the Prior Art

Light-emitting diodes (LEDs) are characterized in low power consumption, long lifetime, small size, no warm-up time, fast reaction speed, and the ability to be manufactured as small or array devices. In addition to outdoor displays, traffic signs, and LCD backlight for various electronic devices such as mobile phones, notebook computers or televisions, LEDs are also widely used as indoor/outdoor lighting devices and in various consumer electronic products.

A light-emitting diode (LED) lighting device directly driven by a rectified alternating-current (AC) voltage typically adopts a plurality of LEDs coupled in series in order to provide required luminance. An LED lighting device is configured to modulate luminous flux and intensity. This time variation is commonly referred to as flicker. LED flicker, whether perceptible or not, has been a concern of the lighting community because of its potential human impacts, which range from distraction, mild annoyance to neurological problems. Therefore, there is a need for an LED driving circuit capable of improving the flicker phenomenon.

SUMMARY OF THE INVENTION

The present invention provides a lighting device driving circuit which includes a transformer circuit, a voltage supply circuit, a voltage-stabilizing circuit, a PWM IC, and a ripple compensation circuit. The transformer circuit is configured to convert an input voltage into a ripple output voltage. The voltage supply circuit is configured to provide a first driving voltage associated with a value of the input voltage and provide a second driving voltage associated with a maximum value of the ripple output voltage. The voltage-stabilizing circuit is configured to provide a first pulse DC voltage and a feedback voltage associated with a variation of the ripple output voltage. The PWM IC is coupled to the transformer circuit, the voltage supply circuit and the voltage-stabilizing circuit, and configured to control an operation of the transformer circuit according to the feedback voltage when activated by the first driving voltage. The ripple compensation circuit is configured to provide a second pulse DC voltage associated with the value of the input voltage, provide a compensation voltage according to the first pulse DC voltage, the second pulse DC voltage and the second driving voltage, and provide a pure DC output voltage by superposing the compensation voltage on the ripple output voltage. A frequency of the compensation voltage is the same as a frequency of the ripple output voltage, and the pure DC output voltage is a voltage with 0 Hertz and a stable level.

The present invention also provides a lighting device driving circuit which includes a transformer circuit, a voltage-stabilizing circuit, and a ripple compensation circuit. The transformer circuit is configured to convert an input voltage into a ripple output voltage. The voltage-stabilizing circuit is configured to provide a first pulse DC voltage and a feedback voltage associated with a variation of the ripple output voltage. The ripple compensation circuit is configured to provide a second pulse DC voltage associated with the value of the input voltage, provide a compensation voltage according to the first pulse DC voltage, the second pulse DC voltage and a driving voltage associated with a maximum value of the ripple output voltage, and provide a pure DC output voltage by superposing the compensation voltage on the ripple output voltage. A frequency of the compensation voltage is the same as a frequency of the ripple output voltage, and the pure DC output voltage is a voltage with 0 Hertz and a stable level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
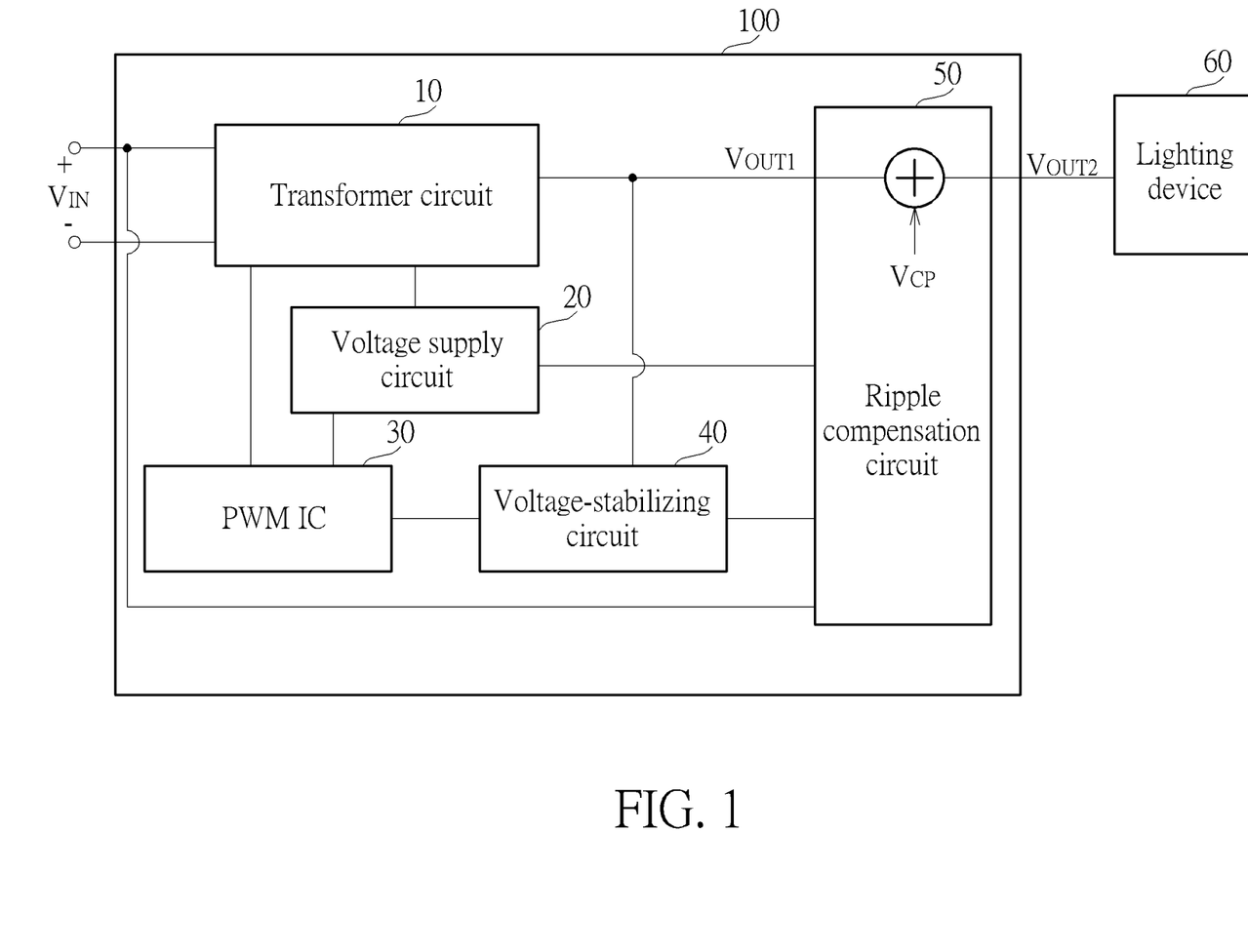
FIG. 1 is a functional diagram illustrating a lighting device driving circuit according to an embodiment of the present invention.

FIG. 1 is a functional diagram illustrating a lighting device driving circuit 100 according to an embodiment of the present invention. The lighting device driving circuit 100 includes a transformer circuit 10, a voltage supply circuit 20, a pulse width modulation integrated circuit (PWM IC) 30, a voltage-stabilizing circuit 40, and a ripple compensation circuit 50. The lighting device driving circuit 100 is configured to convert an input voltage $V_{IN}$ into an output voltage $V_{OUT2}$ for driving a lighting device 60. $I_{IN}$ represents the input current during the operation of the lighting device driving circuit 100. $I_{OUT}$ represents the output current during the operation of the lighting device driving circuit 100.

Figure 2:
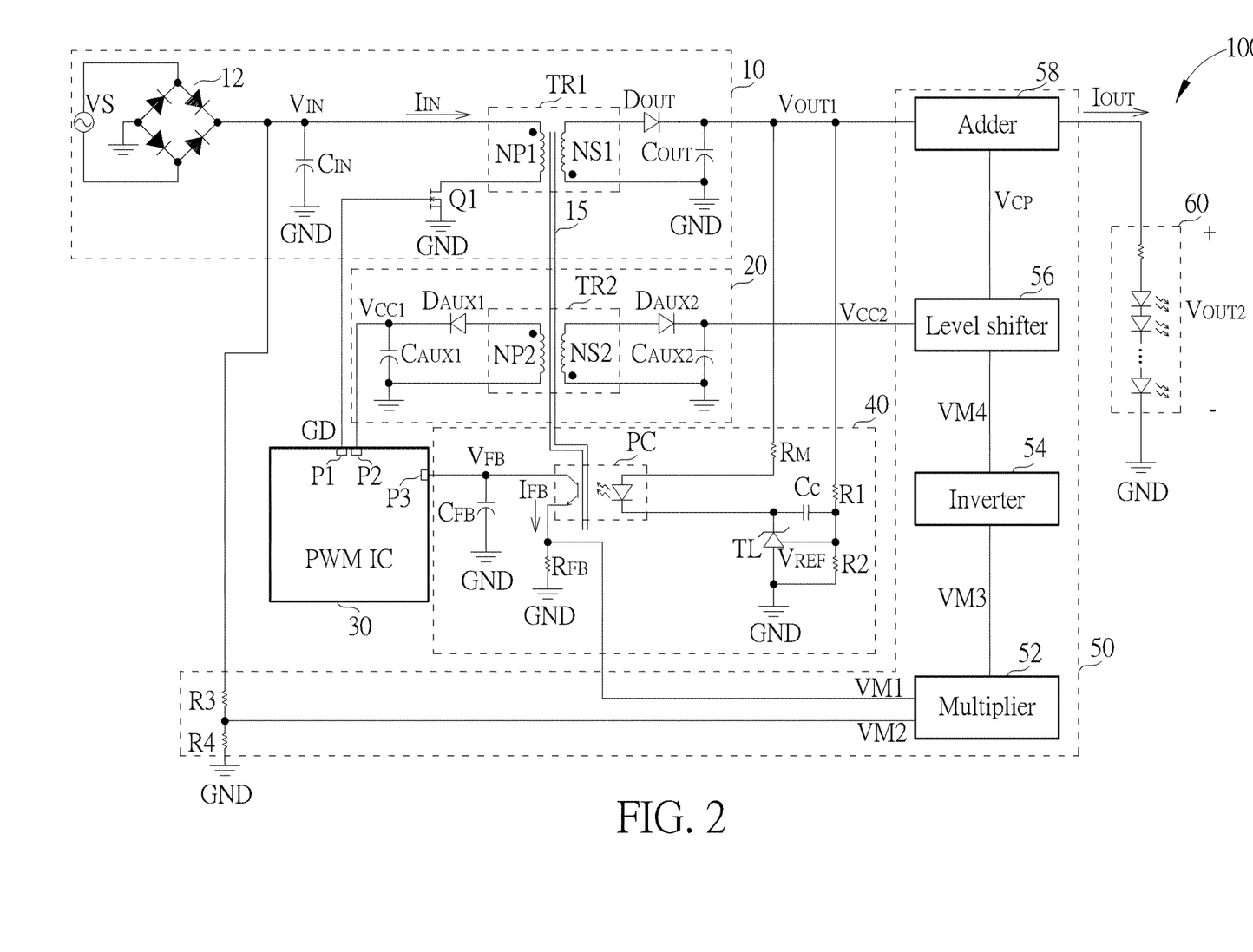
FIG. 2 is a diagram illustrating an implementation of the lighting device driving circuit according to an embodiment of the present invention.

FIG. 2 is a diagram illustrating an implementation of the lighting device driving circuit 100 according to an embodiment of the present invention. The transformer circuit 10 includes a bridge rectifier 12, a main transformer TR1, an input capacitor $C_{IN}$, an output capacitor $C_{OUT}$ an output diode $D_{OUT}$, and a power switch Q1. The bridge rectifier 12 is configured to receive an AC voltage VS having positive and negative periods and convert the output of the AC voltage VS in the negative period for charging the input capacitor $C_{IN}$, thereby providing the direct-current (DC) input voltage $V_{IN}$. The main transformer TR1 includes a primary winding (represented by its number of turns NP1) and a secondary winding (represented by its number of turns NS1). The primary winding NP1 is coupled to the input voltage $V_{IN}$, and the secondary winding NS1 is coupled to the ripple compensation circuit 50 via the output diode $D_{OUT}$. The main transformer TR1 is configured to transfer the energy associated with the input voltage $V_{IN}$ from the primary winding NP1 to the secondary winding NS1, thereby establishing a ripple output voltage $V_{OUT1}$ on the output capacitor $C_{OUT}$, wherein the power switch Q1 is configured to adjust the conversion ratio of the main transformer TR1 according to a control signal GD. Base on Faraday's law of induction, the operation of the main transformer TR1 may be described by an equation of $V_{IN}/V_{OUT1}=I_{OUT}/I_{IN}=NP1/NS1$. In step-up applications, the number of turns in the secondary winding NS1 is larger than the number of turns in the primary winding NP1. In step-down applications, the number of turns in the primary winding NP1 is larger than the number of turns in the secondary winding NS1. In an embodiment, the ratio of NP1 to NS1 may be 40:2. However, the number of turns in the primary or second winding does not limit the scope of the present invention.

The voltage supply circuit 20 includes auxiliary capacitors $C_{AUX1}$~$C_{AUX2}$, auxiliary diodes $D_{AUX1}$~$D_{AUX2}$ and an auxiliary transformer TR2. The auxiliary transformer TR2 includes a primary winding (represented by its number of turns NP2) and a secondary winding (represented by its number of turns NS2). The primary winding NP2 is coupled to the auxiliary capacitor $C_{AUX1}$ via the auxiliary diode $D_{AUX1}$, and the secondary winding NS2 is coupled to the auxiliary capacitor $C_{AUX2}$ via the auxiliary diode $D_{AUX2}$. After receiving the energy from the main transformer TR1, the auxiliary transformer TR2 is configured to establish a driving voltage $V_{CC1}$ on the auxiliary capacitor $C_{AUX1}$ for operating the PWM IC 30 and establish a driving voltage $V_{CC2}$ on the auxiliary capacitor $C_{AUX2}$ for operating the ripple compensation circuit 50.

In the main transformer TR1 and the auxiliary transformer TR2 of the present invention, the primary windings NP1~NP2 and the secondary windings NS1~NS2 and wound around the same magnetic core 15, wherein the primary winding NP1 and the secondary winding NS1 form a voltage conversion unit, the secondary winding NS1 and the primary winding NP2 form a voltage conversion unit, and the primary winding NP2 and the secondary winding NS2 form a voltage conversion unit. In an embodiment, the ratio of NP1 to NS1 to NP2 to NS2 may be 40:2:2:2. However, the number of turns in the primary windings NP1~NP2 and the secondary windings NS1~NS2 does not limit the scope of the present invention.

The PWM IC 30 is disposed on the primary side of the main transformer TR1 and includes 3 pins P1~P3, wherein Pin P1 is coupled to the control end of the power switch Q1 for providing the control signal GD, Pin P2 is coupled to the voltage supply circuit 20 for receiving the driving voltage $V_{CC1}$ for operating the PWM IC 30, and Pin P3 is coupled to the voltage-stabilizing circuit 40 for receiving a feedback voltage $V_{FB}$ associated with the ripple output voltage $V_{OUT1}$. With its first end coupled to the primary winding NP1 of the main transformer TR1, its second end coupled to a ground level GND, and its control end coupled to pin P1 of the PWM IC 30, the power switch Q1 may be selectively turned on or cut off by the control signal GD provided by the PWN IC 30. The PWM IC 30 is configured to adjust the duty cycle of the control signal GD according the feedback voltage $V_{FB}$, thereby modulating the conversion ratio of the main transformer TR1 for maintaining stable output.

The voltage-stabilizing circuit 40 includes a feedback capacitor $C_{FB}$, a compensation capacitor $C_C$, voltage-dividing resistors R1~R2, a feedback resistor $R_{FB}$, a current-limiting resistor $R_M$, a linear optical coupler PC and a voltage stabilizer TL. The linear optical coupler PC includes a photodiode coupled between its two input ends and a phototransistor coupled between its two output ends. The photodiode is disposed on the secondary side of the main transformer TR1 and the phototransistor is disposed on the primary side of the main transformer TR1, thereby capable of performing electrical-optical-electrical conversion between the primary and secondary sides of the main transformer TR1. The voltage-dividing resistors R1 and R2 are coupled in series between the ripple output voltage $V_{OUT1}$ and the ground level GND. The voltage stabilizer TL includes an anode coupled to the ground level GND, a cathode, and a reference end coupled between the voltage-dividing resistors R1 and R2 for receiving a reference voltage $V_{REF}$ associated with the ripple output voltage $V_{OUT1}$, wherein $V_{REF}=V_{OUT1}*R2/(R1+R2)$. The voltage stabilizer TL is configured to adjust the current flowing from its cathode to its anode according to the reference voltage $V_{REF}$, thereby controlling the value of the ripple output voltage $V_{OUT1}$. When the ripple output voltage $V_{OUT1}$ increases, the reference voltage $V_{REF}$ also increases accordingly, which in turn increases the current flowing through the voltage stabilizer TL, thereby reducing the value of the ripple output voltage $V_{OUT1}$ for maintaining stable output. The linear optical coupler PC is configured to detect the variation in the ripple output voltage $V_{OUT1}$ using the photodiode, convert the electrical energy associated with the variation in the ripple output voltage $V_{OUT1}$ into optical energy for transmission to its output side, and convert the optical energy into electrical energy using the phototransistor, thereby charging the feedback capacitor $C_{FB}$ for providing the corresponding feedback voltage $V_{FB}$. Meanwhile, the variation in the feedback voltage $V_{FB}$ influences the feedback current $I_{FB}$ flowing through the phototransistor and establishing a pulse direct-current (DC) voltage VM1 on the feedback resistor $R_{FB}$. Therefore, the values of the feedback voltage $V_{FB}$ and the pulse DC voltage VM1 are both associated with the level of the ripple output voltage $V_{OUT1}$.

The ripple compensation circuit 50 includes voltage-dividing resistors R3~R4, a multiplier 52, an inverter 54, a level shifter 56, and an adder 58. The voltage-dividing resistors R3~R4 is coupled in series between the input voltage $V_{IN}$ and the ground level GND for voltage-dividing the input voltage $V_{IN}$ so as to establish a pulse DC voltage VM2 on the voltage-dividing resistor R4. With its first end coupled to the phototransistor of the linear optical coupler PC and its second end coupled between the voltage-dividing resistors R3-R4 for receiving the pulse DC voltage VM2, the multiplier 52 is configured to provides a pulse DC voltage VM3 by multiplying the pulse DC voltage VM1 and the pulse DC voltage VM2.

Figure 3:
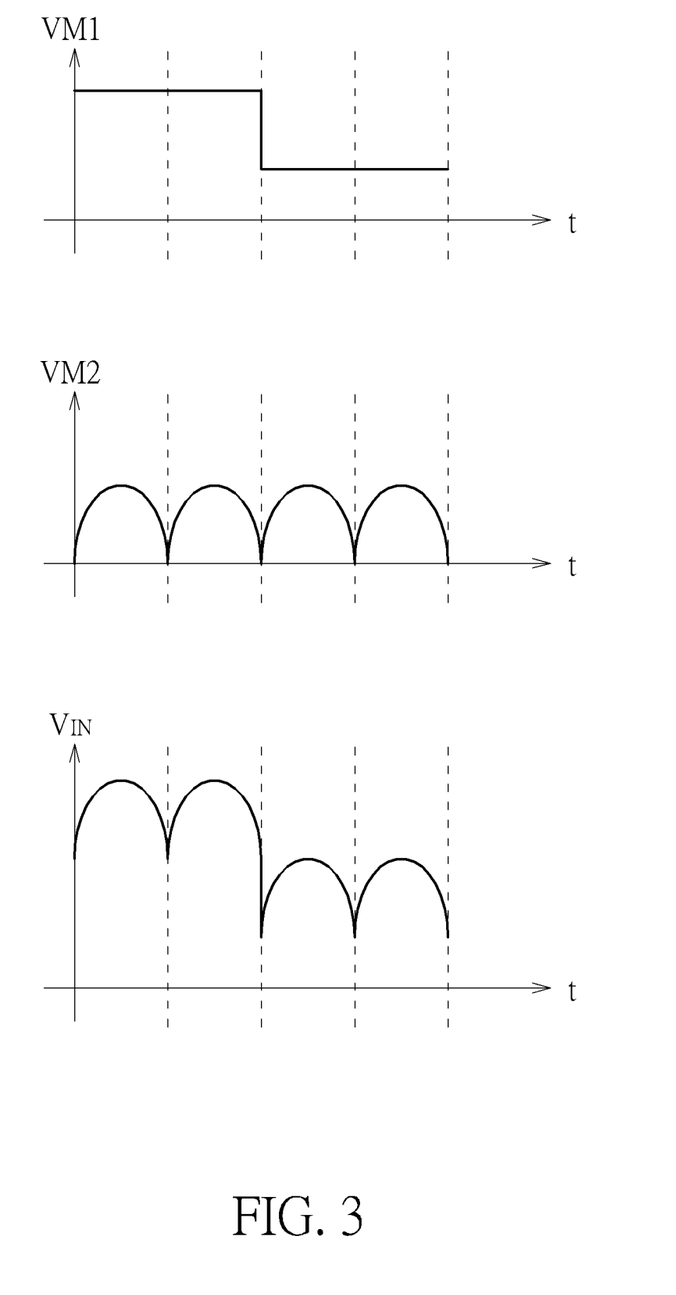
FIG. 3 is a diagram illustrating the waveforms of related voltages during the operation of the multiplier in the ripple compensation circuit according to an embodiment of the present invention.

FIG. 3 is a diagram illustrating the waveforms of related voltages during the operation of the multiplier 52 in the ripple compensation circuit 50 according to an embodiment of the present invention. Under the circumstance in which the output power is maintained at a constant level, the pulse DC voltage VM1 has a larger value when the input voltage $V_{IN}$ is low, and has a smaller value when the input voltage $V_{IN}$ is high. Therefore, after multiplying the pulse DC voltage VM1 and the pulse DC voltage VM2, the value of the pulse DC voltage VM3 provided on the output end of the multiplier 52 may be adaptively adjusted according to the input voltage $V_{IN}$.

With its input end coupled to the output end of the multiplier for receiving the pulse DC voltage VM3, the inverter 54 is configured to invert the pulse DC voltage VM3, thereby providing a corresponding pulse DC voltage VM4 on its output end. With its first input end coupled to the voltage supply circuit 20 for receiving the driving voltage $V_{CC2}$ and its second input end coupled to the output end of the inverter 54 for receiving the pulse DC voltage VM4, the level shifter 56 is configured to adjust the level of the pulse DC voltage VM4 according to the driving voltage $V_{CC2}$, thereby providing a compensation voltage $V_{CP}$ on its output end. With its first input end coupled to the output capacitor $C_{OUT}$ for receiving the ripple output voltage $V_{OUT1}$ and its second input end coupled to the output end of the level shifter 56 for receiving the compensation voltage $V_{CP}$, the adder 58 is configured to superpose the compensation voltage $V_{CP}$ on the ripple output voltage $V_{OUT1}$, thereby providing the corresponding pure DC voltage $V_{OUT2}$.

Figure 4:
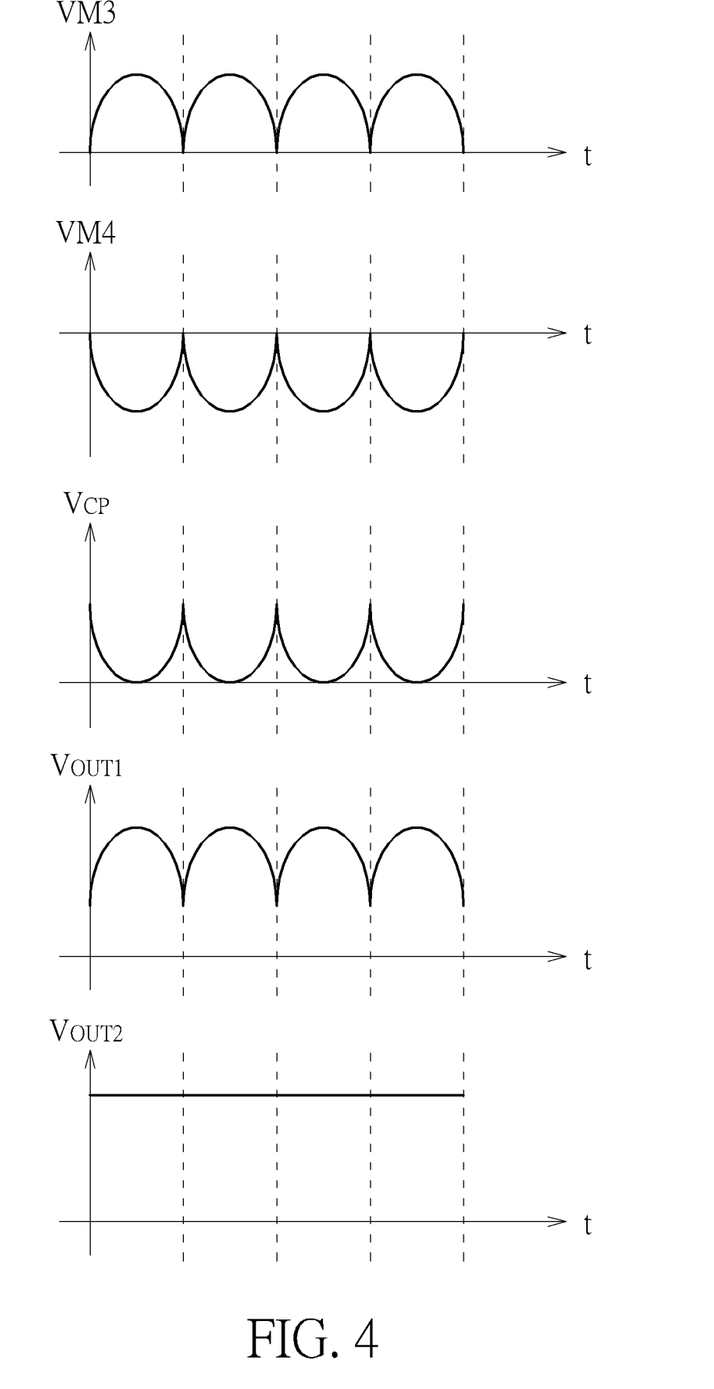
FIG. 4 is a diagram illustrating the waveforms of related voltages during the operation of the ripple compensation circuit according to an embodiment of the present invention.

FIG. 4 is a diagram illustrating the waveforms of related voltages during the operation of the ripple compensation circuit 50 according to an embodiment of the present invention. Since the compensation voltage $V_{CP}$ and the ripple output voltage $V_{OUT1}$ have the same frequency and the value of the compensation voltage $V_{CP}$ reflect the variations on the input/output ends, the lighting device driving circuit 100 may provide the pure DC voltage $V_{OUT2}$ with 0-Hertz frequency and a stable level for driving the lighting device 60, thereby improving flicker phenomenon.

In an embodiment of the present invention, the lighting device 60 may adopt a single LED or multiple LEDs coupled in series. FIG. 2 depicts the embodiment using multiple LEDs which may consist of single-junction LEDs, multi-junction high-voltage (HV) LEDs, or any combination of various types of LEDs. However, the types and configurations of the lighting device 60 do not limit the scope of the present invention.

In an embodiment of the present invention, the value of the input capacitor $C_{IN}$ may be 120 μF (with ±20% tolerance), the value of the output capacitor $C_{OUT}$ may be 680 μF (with ±20% tolerance), the value of the auxiliary capacitors $C_{AUX1}$ and $C_{AUX2}$ may be 10 μF (with ±10% tolerance), the value of the feedback capacitor $C_{FB}$ may be 100 nF (with ±5% tolerance), the value of the compensation capacitor $C_C$ may be 330 nF (with ±5% tolerance), the value of the voltage-dividing resistor R1 may be 70 KΩ (with ±1% tolerance), the value of the voltage-dividing resistor R2 may be 10 KΩ (with ±1% tolerance), the value of the voltage-dividing resistor R3 may be 100 KΩ (with ±1% tolerance), the value of the voltage-dividing resistor R4 may be 10 KΩ (with ±1% tolerance), the value of the feedback resistor $R_{FB}$ may be 1 KΩ (with ±1% tolerance), and the value of the current-limiting resistor $R_M$ may be 15 KΩ (with ±1% tolerance). However, the values of the above-mentioned devices do not limit the scope of the present invention.

In conclusion, the present lighting device driving circuit can provide a compensation voltage using a ripple compensation circuit, wherein the compensation voltage and the ripple output voltage have the same frequency and the value of the compensation voltage reflects the variations on the input/output ends. By superposing the compensation voltage on the ripple output voltage, the present lighting device driving circuit can provide a pure DC voltage $V_{OUT2}$ with a 0-Hertz frequency and a stable level for driving a lighting device, thereby improving flicker phenomenon.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A lighting device driving circuit, comprising:
 a transformer circuit configured to convert an input voltage into a ripple output voltage;
 a voltage supply circuit configured to provide a first driving voltage associated with a value of the input voltage and provide a second driving voltage associated with a maximum value of the ripple output voltage;
 a voltage-stabilizing circuit configured to provide a first pulse direct-current (DC) voltage and a feedback voltage associated with a variation of the ripple output voltage;
 a pulse width modulation integrated circuit (PWM IC) coupled to the transformer circuit, the voltage supply circuit and the voltage-stabilizing circuit, and configured to control an operation of the transformer circuit according to the feedback voltage when activated by the first driving voltage; and
 a ripple compensation circuit configured to:
  provide a second pulse DC voltage associated with the value of the input voltage;
  provide a compensation voltage according to the first pulse DC voltage, the second pulse DC voltage and the second driving voltage; and
  provide a pure DC output voltage by superposing the compensation voltage on the ripple output voltage, wherein a frequency of the compensation voltage is the same as a frequency of the ripple output voltage, and the pure DC output voltage is a voltage with 0 Hertz and a stable level.

2. The lighting device driving circuit of claim 1, wherein the transformer circuit comprises:
 a first transformer comprising a first primary winding and a first secondary winding, and configured to transfer an energy associated with the input voltage from the first primary winding to the first secondary winding so as to provide an energy associated with the ripple output voltage on the first secondary winding;
 an input capacitor coupled between the first primary winding and a ground level for storing the energy associated with the input voltage;
 an output capacitor coupled between the first secondary winding and the ground level for storing the energy associated with the ripple output voltage; and
 a power switch selectively turned on or cut off by a control signal and comprising:
  a first end coupled to the first primary winding;
  a second end; and
  a control end coupled to receive the control signal.

3. The lighting device driving circuit of claim 2, wherein the PWM IC is further configured to provide the control signal when activated by the first driving voltage and adjust a duty cycle of the control signal according the feedback voltage so as to modulate a conversion ratio of the first transformer.

4. The lighting device driving circuit of claim 2, wherein the transformer circuit further comprises:
 a bridge rectifier configured to convert an alternating-current (AC) voltage into the input voltage; and
 an output diode having an anode coupled to the first secondary winding and a cathode coupled to the output capacitor.

5. The lighting device driving circuit of claim 2, wherein the voltage supply circuit comprises:
- a second transformer comprising a second primary winding and a second secondary winding, wherein the first primary winding, the first secondary winding, the second primary winding and the second secondary winding are wound around a same magnetic core;
- a first auxiliary diode, comprising;
  - an anode coupled to the second primary winding; and
  - a cathode;
- a second auxiliary diode, comprising;
  - an anode coupled to the second secondary winding; and
  - a cathode;
- a first auxiliary capacitor for storing an energy associated with the first driving voltage and comprising;
  - a first end coupled to the cathode of the first auxiliary diode; and
  - a second end coupled to a ground level; and
- a second auxiliary capacitor for storing an energy associated with the second driving voltage and comprising;
  - a first end coupled to the cathode of the second auxiliary diode; and
  - a second end coupled to the ground level.

6. The lighting device driving circuit of claim 1, wherein the voltage supply circuit comprises:
- a second transformer comprising a second primary winding and a second secondary winding;
- a first auxiliary diode, comprising;
  - an anode coupled to the second primary winding; and
  - a cathode;
- a second auxiliary diode, comprising;
  - an anode coupled to the second secondary winding; and
  - a cathode;
- a first auxiliary capacitor for storing an energy associated with the first driving voltage and comprising;
  - a first end coupled to the cathode of the first auxiliary diode; and
  - a second end coupled to a ground level; and
- a second auxiliary capacitor for storing an energy associated with the second driving voltage and comprising;
  - a first end coupled to the cathode of the second auxiliary diode; and
  - a second end coupled to the ground level.

7. The lighting device driving circuit of claim 1, wherein: the voltage-stabilizing circuit comprises:
- a first voltage-dividing resistor and a second voltage-dividing resistor coupled in series between the ripple output voltage and a ground level;
- a voltage stabilizer comprising:
  - an anode coupled to the ground level;
  - a cathode; and
  - a reference end coupled between the first voltage-dividing resistor and the second voltage-dividing resistor;
- a current-limiting resistor;
- a linear optical coupler comprising a first input end, a second input end, a first output end and a second output end, and configured to convert a first electrical energy established between the first input end and the second input end into an optical energy and then convert the optical energy into a second electrical energy established between the first output end and the second output end;
- a feedback capacitor coupled between the first output end and the ground level for storing the second electrical energy so as to provide the feedback voltage; and
- a feedback resistor coupled between the second output end and the ground level for providing the first pulse DC voltage according to a feedback current flowing through the first output end and the second output end;
- the first input end of the linear optical coupler is coupled to the ripple output voltage via the current-limiting resistor;
- the second input end of the linear optical coupler is coupled to the cathode of the voltage stabilizer;
- the first output end of the linear optical coupler is coupled to the ground level via the feedback capacitor; and
- the second output end of the linear optical coupler is coupled to the ground level via the feedback resistor.

8. The lighting device driving circuit of claim 7, wherein the linear optical coupler comprises:
- a photodiode coupled between the first input end and the second input end; and
- a phototransistor coupled between the first output end and the second output end.

9. The lighting device driving circuit of claim 1, wherein the ripple compensation circuit comprises:
- a third voltage-dividing resistor and a fourth voltage-dividing resistor coupled in series between the input voltage and a ground level for voltage-dividing the input voltage so as to establish the second pulse DC voltage on the fourth voltage-dividing resistor;
- a multiplier configured to provide a third pulse DC voltage by multiplying the first pulse DC voltage and the second pulse DC voltage;
- an inverter configured to provide a fourth pulse DC voltage by inverting the third pulse DC voltage;
- a level shifter configured to provide the compensation voltage by adjusting a level of the fourth pulse DC voltage according to the second driving voltage; and
- an adder configured to provide the pure DC voltage by superposing the compensation voltage on the ripple output voltage.

10. The lighting device driving circuit of claim 9, wherein:
the multiplier comprises:
- a first input end coupled to the voltage-stabilizing circuit for receiving the first pulse AC voltage;
- a second input end coupled between the third voltage-dividing resistor and the fourth voltage-dividing resistor for receiving the second pulse AC voltage; and
- an output end for outputting the third pulse AC voltage;

the inverter comprises:
- an input end coupled to the multiplier for receiving the third pulse AC voltage; and
- an output end for outputting the fourth pulse AC voltage;

the level shifter comprises:
- a first input end coupled to the voltage supply circuit for receiving the second pulse AC voltage;
- a second input end coupled the output end of the inverter for receiving the fourth pulse AC voltage; and
- an output end for outputting the compensation voltage; and the adder comprises:
- a first input end coupled to the transformer circuit for receiving the ripple output voltage;
- a second input end coupled the output end of the level shifter for receiving the compensation voltage; and an output end for outputting the pure DC output voltage.

11. A lighting device driving circuit, comprising:
a transformer circuit configured to convert an input voltage into a ripple output voltage;
a voltage-stabilizing circuit configured to provide a first pulse direct-current (DC) voltage and a feedback voltage associated with a variation of the ripple output voltage, and comprising:
    a first voltage-dividing resistor and a second voltage-dividing resistor coupled in series between the ripple output voltage and a ground level;
    a voltage stabilizer comprising:
        an anode coupled to the ground level;
        a cathode; and
        a reference end coupled between the first voltage-dividing resistor and the second voltage-dividing resistor;
    a current-limiting resistor;
    a linear optical coupler comprising a first input end, a second input end, a first output end and a second output end, and configured to convert a first electrical energy established between the first input end and the second input end into an optical energy and then convert the optical energy into a second electrical energy established between the first output end and the second output end;
    a feedback capacitor coupled between the first output end and the ground level for storing the second electrical energy so as to provide the feedback voltage; and
    a feedback resistor coupled between the second output end and the ground level for providing the first pulse DC voltage according to a feedback current flowing through the first output end and the second output end, wherein:
        the first input end of the linear optical coupler is coupled to the ripple output voltage via the current-limiting resistor;
        the second input end of the linear optical coupler is coupled to the cathode of the voltage stabilizer;
        the first output end of the linear optical coupler is coupled to the ground level via the feedback capacitor; and
        the second output end of the linear optical coupler is coupled to the ground level via the feedback resistor; and
a ripple compensation circuit configured to:
    provide a second pulse DC voltage associated with the value of the input voltage;
    provide a compensation voltage according to the first pulse DC voltage, the second pulse DC voltage and a first driving voltage associated with a maximum value of the ripple output voltage; and
    provide a pure DC output voltage by superposing the compensation voltage on the ripple output voltage, wherein a frequency of the compensation voltage is the same as a frequency of the ripple output voltage, and the pure DC output voltage is a voltage with 0 Hertz and a stable level.

12. The lighting device driving circuit of claim 11, wherein the linear optical coupler comprises:
a photodiode coupled between the first input end and the second input end; and
a phototransistor coupled between the first output end and the second output end.

13. The lighting device driving circuit of claim 11, wherein the transformer circuit comprises:
a first transformer comprising a first primary winding and a first secondary winding, and configured to transfer an energy associated with the input voltage from the first primary winding to the first secondary winding so as to provide an energy associated with the ripple output voltage on the first secondary winding;
an input capacitor coupled between the first primary winding and a ground level for storing the energy associated with the input voltage;
an output capacitor coupled between the first secondary winding and the ground level for storing the energy associated with the ripple output voltage; and
a power switch selectively turned on or cut off by a control signal and comprising:
    a first end coupled to the first primary winding;
    a second end; and
    a control end coupled to receive the control signal.

14. The lighting device driving circuit of claim 13, wherein the transformer circuit further comprises:
a bridge rectifier configured to convert an AC voltage into the input voltage; and
an output diode having an anode coupled to the first secondary winding and a cathode coupled to the output capacitor.

15. The lighting device driving circuit of claim 13, further comprising a voltage supply circuit configured to provide the first driving voltage associated with the maximum value of the ripple output voltage and a second driving voltage associated with a value of the input voltage.

16. The lighting device driving circuit of claim 15, wherein the voltage supply circuit comprises:
a second transformer comprising a second primary winding and a second secondary winding, wherein the first primary winding, the first secondary winding, the second primary winding and the second secondary winding are wound around a same magnetic core;
a first auxiliary diode, comprising:
    an anode coupled to the second primary winding; and
    a cathode;
a second auxiliary diode, comprising:
    an anode coupled to the second secondary winding; and
    a cathode;
a first auxiliary capacitor for storing an energy associated with the first driving voltage and comprising:
    a first end coupled to the cathode of the first auxiliary diode; and
    a second end coupled to a ground level; and
a second auxiliary capacitor for storing an energy associated with the second driving voltage and comprising:
    a first end coupled to the cathode of the second auxiliary diode; and
    a second end coupled to the ground level.

17. The lighting device driving circuit of claim 15, further comprising a pulse width modulation integrated circuit (PWM IC) coupled to the transformer circuit, the voltage supply circuit and the voltage-stabilizing circuit, and configured to control an operation of the transformer circuit according to the feedback voltage when activated by the second driving voltage and adjust a duty cycle of the control signal according the feedback voltage so as to modulate a conversion ratio of the first transformer.

18. A lighting device driving circuit, comprising:
a transformer circuit configured to convert an input voltage into a ripple output voltage;

a voltage-stabilizing circuit configured to provide a first pulse direct-current (DC) voltage and a feedback voltage associated with a variation of the ripple output voltage; and a ripple compensation circuit configured to:
provide a second pulse DC voltage associated with the value of the input voltage;
provide a compensation voltage according to the first pulse DC voltage, the second pulse DC voltage and a first driving voltage associated with a maximum value of the ripple output voltage; and
provide a pure DC output voltage by superposing the compensation voltage on the ripple output voltage, wherein a frequency of the compensation voltage is the same as a frequency of the ripple output voltage, and the pure DC output voltage is a voltage with 0 Hertz and a stable level, wherein the ripple compensation circuit comprises:
a third voltage-dividing resistor and a fourth voltage-dividing resistor coupled in series between the input voltage and a ground level for voltage-dividing the input voltage so as to establish the second pulse DC voltage on the fourth voltage-dividing resistor;
a multiplier configured to provide a third pulse DC voltage by multiplying the first pulse DC voltage and the second pulse DC voltage;
an inverter configured to provide a fourth pulse DC voltage by inverting the third pulse DC voltage;
a level shifter configured to provide the compensation voltage by adjusting a level of the fourth pulse DC voltage according to the first driving voltage; and an adder configured to provide the pure DC voltage by superposing the compensation voltage on the ripple output voltage.

19. The lighting device driving circuit of claim 18, wherein:
the multiplier comprises:
a first input end coupled to the voltage-stabilizing circuit for receiving the first pulse AC voltage;
a second input end coupled between the third voltage-dividing resistor and the fourth voltage-dividing resistor for receiving the second pulse AC voltage; and
an output end for outputting the third pulse AC voltage;
the inverter comprises:
an input end coupled to the multiplier for receiving the third pulse AC voltage; and
an output end for outputting the fourth pulse AC voltage;
the level shifter comprises:
a first input end coupled to receive the second pulse AC voltage;
a second input end coupled the output end of the inverter for receiving the fourth pulse AC voltage; and
an output end for outputting the compensation voltage; and
the adder comprises:
a first input end coupled to receive the ripple output voltage;
a second input end coupled the output end of the level shifter for receiving the compensation voltage; and
an output end for outputting the pure DC output voltage.

* * * * *